United States Patent
Pan

(10) Patent No.: US 10,288,183 B2
(45) Date of Patent: May 14, 2019

(54) WALL-MOUNTED WATER-CONTROLLING VALVE ASSEMBLY

(71) Applicant: SHENG TAI BRASSWARE CO., LTD., Changhua Hsien (TW)

(72) Inventor: Chin-Chi Pan, Changhua Hsien (TW)

(73) Assignee: Sheng Tai Brassware Co., Ltd., Changhua Hsien (TW)

( * ) Notice: Subject to any disclaimer, the term of this patent is extended or adjusted under 35 U.S.C. 154(b) by 96 days.

(21) Appl. No.: 15/632,557

(22) Filed: Jun. 26, 2017

(65) Prior Publication Data

US 2018/0372234 A1 Dec. 27, 2018

(51) Int. Cl.
| | |
|---|---|
| *F16K 25/00* | (2006.01) |
| *E03C 1/04* | (2006.01) |
| *E03C 1/042* | (2006.01) |
| *F16K 11/00* | (2006.01) |
| *F16K 29/00* | (2006.01) |

(52) U.S. Cl.
CPC .............. *F16K 25/00* (2013.01); *E03C 1/042* (2013.01); *E03C 1/0403* (2013.01); *F16K 19/006* (2013.01); *F16K 29/00* (2013.01)

(58) Field of Classification Search
CPC ..... F16K 25/00; F16K 29/00; Y10T 137/6977
See application file for complete search history.

(56) References Cited

U.S. PATENT DOCUMENTS

| | | | | |
|---|---|---|---|---|
| 1,436,667 A | * | 11/1922 | Mueller ................. | F16K 27/12 137/359 |
| 4,395,018 A | * | 7/1983 | Moen .................... | F16K 5/0428 251/310 |
| 4,662,389 A | * | 5/1987 | Igbal .................... | E03C 1/0401 137/359 |
| 5,257,645 A | * | 11/1993 | Scully ..................... | E03C 1/04 137/359 |
| 5,947,149 A | * | 9/1999 | Mark .................... | F16K 31/602 137/359 |
| 6,345,643 B1 | * | 2/2002 | Ko ........................ | E03C 1/0401 137/315.12 |
| 2003/0136934 A1 | * | 7/2003 | Erickson ................. | E03C 1/042 251/293 |

* cited by examiner

*Primary Examiner* — Michael R Reid
*Assistant Examiner* — Patrick C Williams
(74) *Attorney, Agent, or Firm* — Rosenberg, Klein & Lee

(57) ABSTRACT

A wall-mounted water-controlling valve assembly has a seat, a valve jacket, a valve, a fixing ring, and a covering cap. The seat is deposited inside a wall and has a tubular sleeve. The valve jacket is slidably mounted in the tubular sleeve of the seat. The valve is mounted in the valve jacket. The fixing ring is connected to the tubular sleeve by screwing. The covering cap is connected to the valve jacket and the fixing ring and has a front side and a rear side. The front side of the covering cap is connected to the valve jacket. The rear side of the covering cap is connected to the fixing ring. The valve is scalably in the tubular sleeve via the valve jacket to adjust a protruding length of the wall-mounted water-controlling valve assembly to remain at the same length relative to the wall.

15 Claims, 6 Drawing Sheets

WALL-MOUNTED WATER-CONTROLLING VALVE ASSEMBLY

BACKGROUND OF THE INVENTION

1. Field of Invention

The present invention relates to a water-controlling valve assembly, and more particularly to a wall-mounted water-controlling valve assembly that may control the opening and closing of a water source and may automatically adjust a protruding length of the wall-mounted water-controlling valve assembly relative to a wall.

2. Description of the Related Art

With reference to FIG. 6, a conventional wall-mounted water-controlling valve assembly has a seat 90, a jacket 91, a valve 92, and a covering cap 93. The seat 90 is deposited inside a wall. The jacket 91 is connected to the seat 90 and extends out of the wall. The valve 92 is mounted in the jacket 91. The covering cap 93 is connected to the jacket 91 to deposit the valve 92 on the jacket 91.

In assembly, the covering cap 93 is rotated to screw with the jacket 91 to hold the valve 92 securely with the jacket 91, and is easy and convenient in use. However, a protruding length of the jacket 91 that extends out of the wall is not constant, depending on a depth of the seat 90 deposited inside the wall and the position of the wall. Furthermore, the depth of the seat 90 is not easy to control and the protruding lengths of the conventional wall-mounted water-controlling valve assemblies may be inconsistent, and this may influence the construction quality of buildings and may increase the difficulty of installation and operation of the conventional wall-mounted water-controlling valve assembly.

The wall-mounted water-controlling valve assembly in accordance with the present invention mitigates or obviates the aforementioned problems.

SUMMARY OF THE INVENTION

The primary objective of the present invention is to provide a wall-mounted water-controlling valve assembly that may control the opening and closing of a water source and may automatically adjust a protruding length of the wall-mounted water-controlling valve assembly relative to a wall.

The wall-mounted water-controlling valve assembly in accordance with the present invention has a seat, a valve jacket, a valve, a fixing ring, and a covering cap. The seat is deposited inside a wall and has a tubular sleeve. The valve jacket is slidably mounted in the tubular sleeve of the seat. The valve is mounted in the valve jacket. The fixing ring is connected to the tubular sleeve by screwing. The covering cap is connected to the valve jacket and the fixing ring and has a front side and a rear side. The front side of the covering cap is connected to the valve jacket. The rear side of the covering cap is connected to the fixing ring. The valve is scalably slid in the tubular sleeve via the valve jacket to adjust a protruding length of the wall-mounted water-controlling valve assembly to remain at the same length relative to the wall.

Other objectives, advantages and novel features of the invention will become more apparent from the following detailed description when taken in conjunction with the accompanying drawings.

BRIEF DESCRIPTION OF THE DRAWINGS

FIG. 4A is an enlarged side view in partial section of the wall-mounted water-controlling valve assembly in FIG. 4;

DETAILED DESCRIPTION OF THE INVENTION

Figure 1:
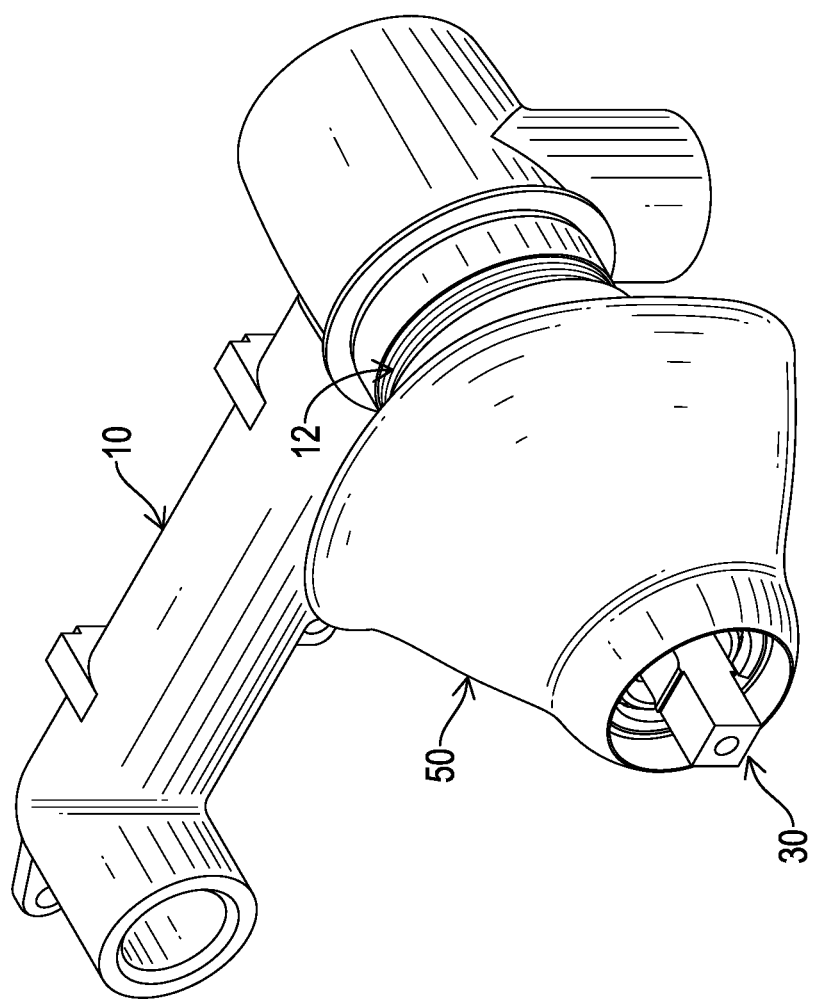
FIG. 1 is a perspective view of a wall-mounted water-controlling valve assembly in accordance with the present invention.

With reference to FIGS. 1 to 4, a wall-mounted water-controlling valve assembly in accordance with the present invention has a seat 10, a valve jacket 20, a valve 30, a fixing ring 40, and a covering cap 50.

Figure 2:
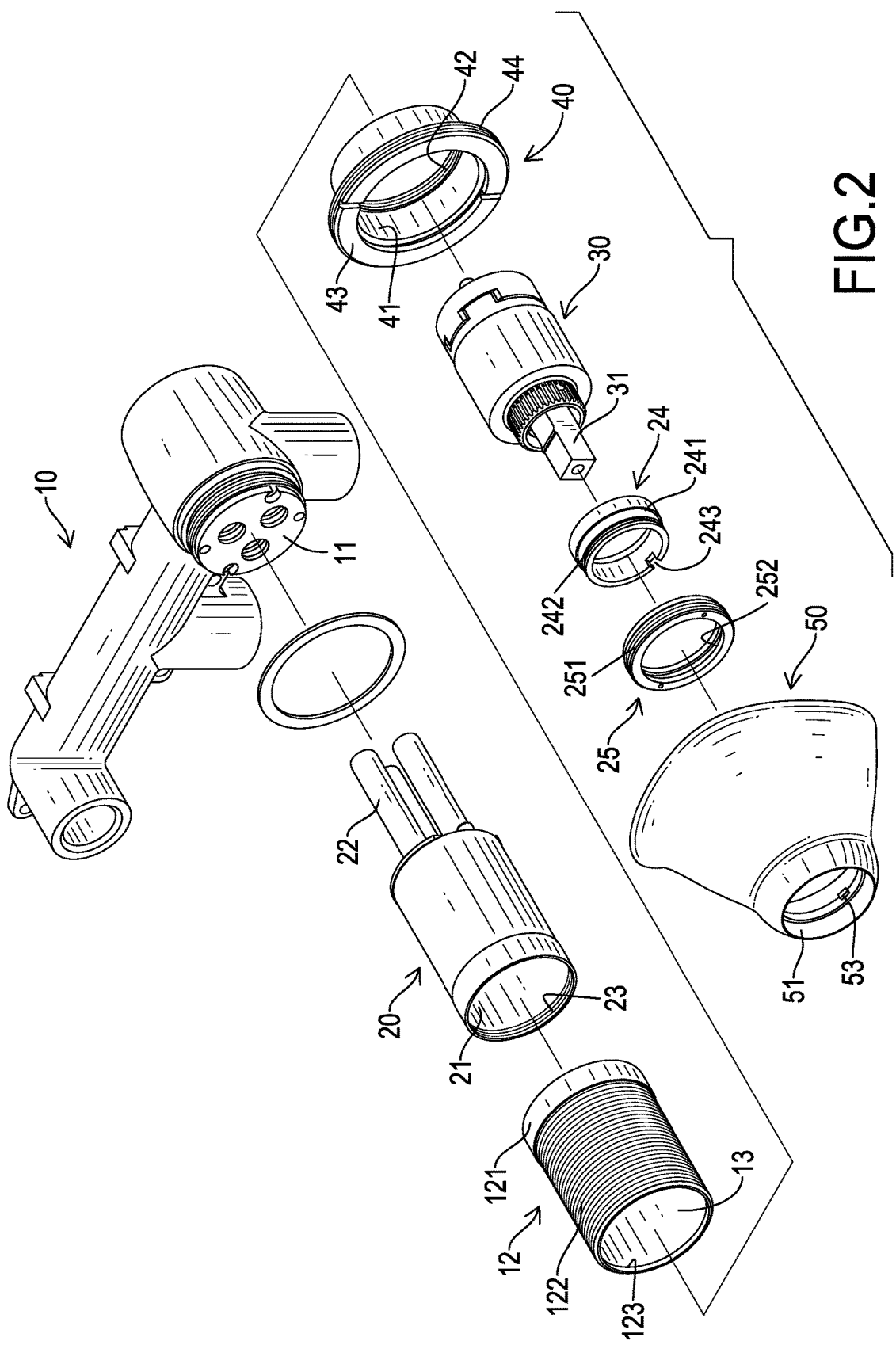
FIG. 2 is an exploded perspective view of the wall-mounted water-controlling valve assembly in FIG. 1.
Figure 4:
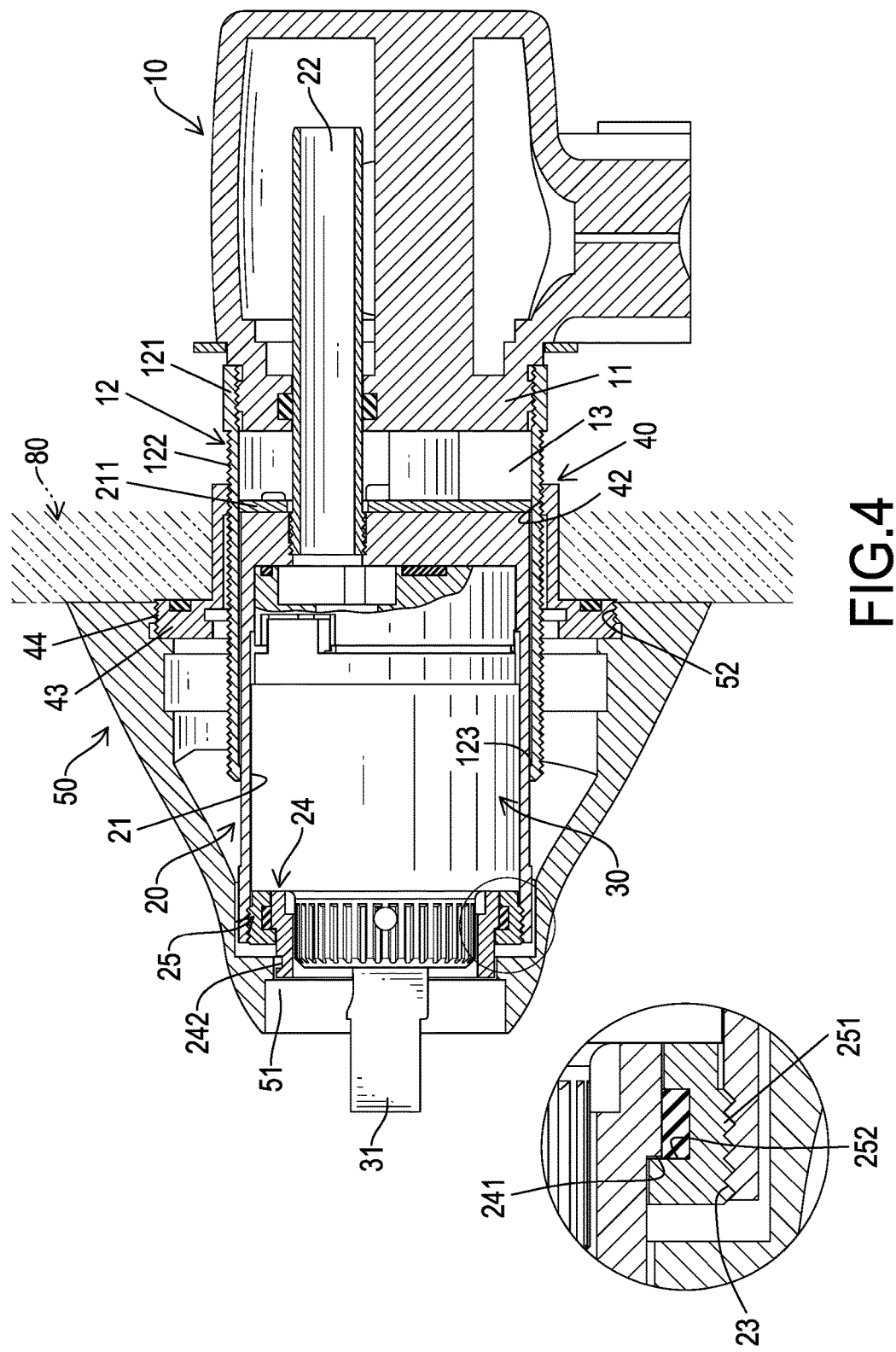
FIG. 4 is a side view in partial section of the wall-mounted water-controlling valve assembly in FIG. 1, mounted on a wall.

With reference to FIGS. 2 and 4, the seat 10 may be deposited inside a wall 80, is connected to an outlet pipe seat of a water source, and has at least one linking base 11, a tubular sleeve 12, and a chamber 13. The at least one linking base 11 is used to provide output of the water source. The tubular sleeve 12 may be round, is detachably attached to the at least one linking base 11, and extends out of the wall 80. The tubular sleeve 12 has an external surface, an internal surface, a connecting end 121, an outer end, a screwing face 122, and a limiting flange 123. The connecting end 121 of the tubular sleeve 12 is connected to the at least one linking base 11 by screw. The outer end of the tubular sleeve 12 is deposited opposite to the connecting end 121 of the tubular sleeve 12, and extends out of the wall 80. The screwing face 122 is formed on and around the external surface of the tubular sleeve 12 between the connecting end 121 and the outer end of the tubular sleeve 12. The limiting flange 123 is formed on and protrudes from the internal surface of the tubular sleeve 12 at the outer end of the tubular sleeve 12. The chamber 13 is deposited between the at least one linking base 11 and the tubular sleeve 12 and has an opening formed at the outer end of the tubular sleeve 12.

The valve jacket 20 is connected to the seat 10, may be a hollow tube, and has an outer diameter, an external surface, an internal surface, an open end, a closed end, a valve room 21, a set of water pipes 22, a threaded segment 23, a limiting ring 25, and a rotating ring 24. The outer diameter of the valve jacket 20 corresponds to an inner diameter of the chamber 13 of the seat 10, and this enables the valve jacket 20 to insert into the chamber 13 of the seat 10 slidably. The valve room 21 is deposited in the valve jacket 20 between the open end and the closed end of the valve jacket 20, communicates with the open end of the valve jacket 20, and has an engaging flange 211. The engaging flange 211 is deposited on the closed end of the valve jacket 20, extends out of the external surface of the valve jacket 20, and selectively engages with the limiting flange 123 of the tubular sleeve 12 to prevent the valve jacket 20 separating from the outer end of the tubular sleeve 12.

The set of water pipes 22 is connected to the closed end of the valve jacket 20 and extends into the at least one linking base 11. The threaded segment 23 is formed on the internal surface of the valve jacket 20 at the open end of the valve jacket 20. The limiting ring 25 is connected to the threaded segment 23 at the open end of the valve jacket 20, and has an outer diameter, an inner diameter, an external surface, an internal surface, a screwing portion 251, and a positioning flange 252. The outer diameter of the limiting ring 25 corresponds to an inner diameter of the valve room 21. The screwing portion 251 is formed on the external surface of the limiting ring 25 and is connected to the threaded segment 23 of the valve jacket 20 to hold the limiting ring 25 in the valve jacket 20 at the open end of the valve jacket 20. The positioning flange 252 is formed on and protrudes inwardly from the internal surface of the limiting ring 25.

Figure 3:
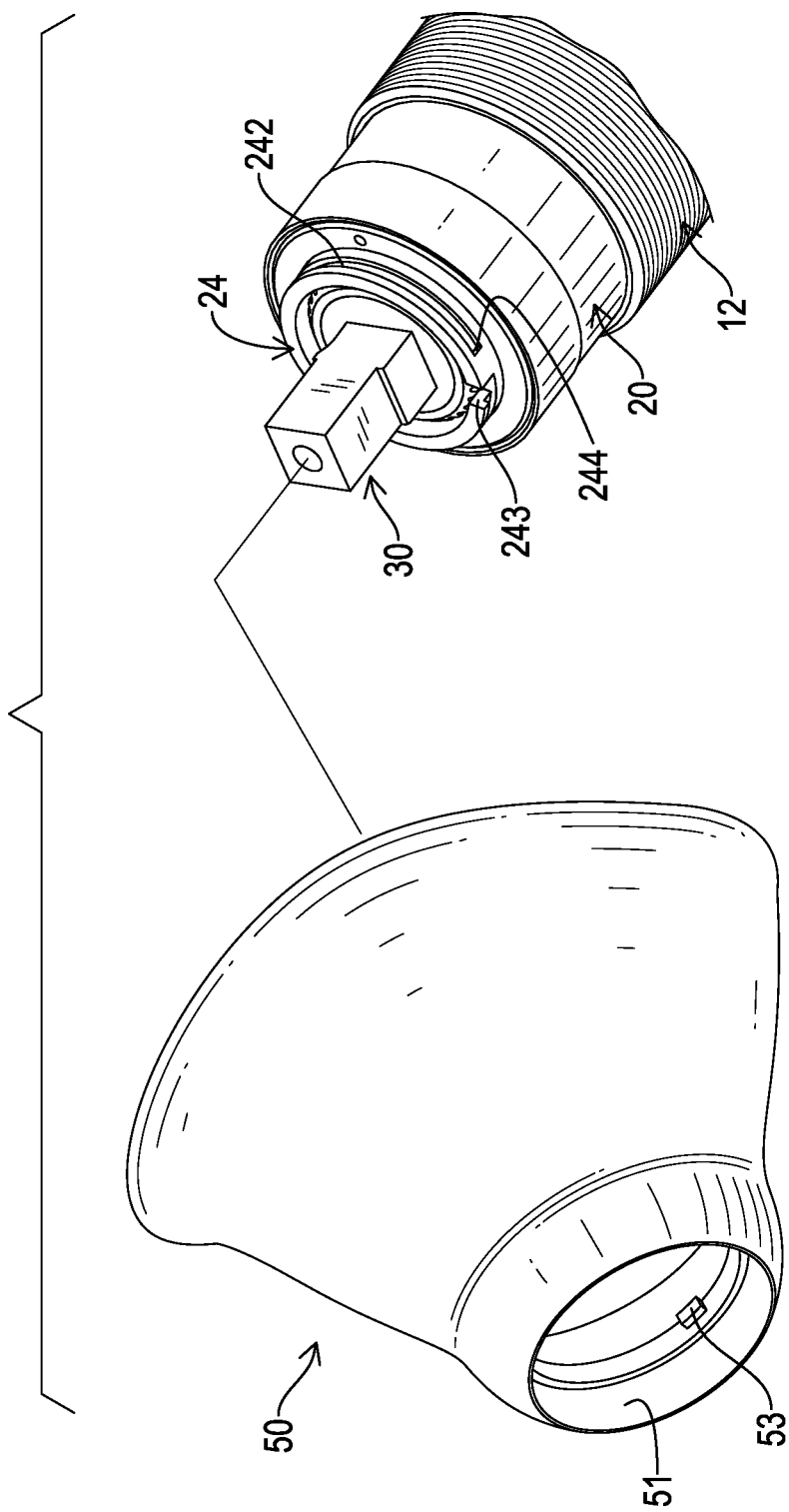
FIG. 3 is a further exploded and enlarged perspective view of the wall-mounted water-controlling valve assembly in FIG. 2.

With reference to FIGS. 2, 3, and 4, the rotating ring 24 is connected to the limiting ring 25 and has an external surface, an outer periphery, a front end, a rear end, a step edge 241, an annular groove 242, an engaging mouth 243, and a stopping flange 244. The step edge 241 is formed on the external surface of the rotating ring 24 between the front end and the rear end of the rotating ring 24 to form two outer diameters on the external surface of the rotating ring 24. One of the two diameters of the rotating ring 24 is defined between the front end of the rotating ring 24 and the step edge 241 of the rotating ring 24 and is smaller than the other diameter of the rotating ring 24 that is defined between the step edge 241 and the rear end of the rotating ring 24. In addition, the step edge 241 of the rotating ring 24 is pressed against the positioning flange 252 of the limiting ring 25.

With further reference to FIG. 3, the annular groove 242 may be C-shaped, is formed on the external surface of the rotating ring 24 between the step edge 241 and the front end of the rotating ring 24, and has two ends. Then, the rotating ring 24 is rotatably deposited on the front end of the valve jacket 20 via the limiting ring 25, and the annular groove 242 and the front end of the rotating ring 24 extend out of the limiting ring 25. The engaging mouth 243 is formed through the outer periphery of the rotating ring 24 and communicates with one of the two ends of the annular groove 242. The stopping edge 244 is deposited on the outer periphery of the rotating ring 24 at the other end of the annular groove 242. That is, the engaging mouth 243 and the stopping edge 244 are deposited on the outer periphery of the rotating ring 24 at a spaced interval.

The valve 30 is mounted in the valve room 21 of the valve jacket 20 and has a front end and a valve stem 31. The interior structure of the valve 30 is conventional and the features and the structures of the valve 30 are not described in detail. The valve stem 31 is deposited on the front end of the valve 30 to drive the valve 30. With reference to FIGS. 4 and 4A, the valve 30 is mounted in the valve room 21 of the valve jacket 20, and the rotating ring 24 and the limiting ring 25 are mounted in the valve room 21 of the valve jacket 20 to hold the valve 30 in the valve room 21 between the closed end of the valve jacket 20 and the limiting ring 25.

The fixing ring 40 is mounted around the tubular sleeve 12 of the seat 10, and has a front side, a rear side, an internal surface, a mounting hole 41, an inner thread face 42, a protruding flange 43, and a threaded portion 44. The mounting hole 41 is formed through the front side and the rear side of the fixing ring 40 and has an inner diameter corresponding to an outer diameter of the tubular sleeve 12 of the seat 10.

The inner thread face 42 is formed on the internal surface of the fixing ring 40 adjacent to the rear side of the fixing ring 40, and is screwed with the screwing face 122 of the tubular sleeve 12 to connect the fixing ring 40 with the tubular sleeve 12. The protruding flange 43 is formed on and protrudes radially from the front side of the fixing ring 40 and has an external surface. The threaded portion 44 is formed on the external surface of the protruding flange 43.

The covering cap 50 is a hollow and annular cover, is mounted around the valve jacket 20 and the tubular sleeve 12, and has a front side, a rear side, an internal surface, a valve hole 51, a screwed segment 52, and an engaging block 53. The valve hole 51 is formed through the front side of the covering cap 50, and is mounted around the open end of the valve jacket 20 to enable the valve stem 31 of the valve 30 to extend out of the covering cap 50 via the valve hole 51. The screwed segment 52 is formed on the internal surface of the covering cap 50 adjacent to the rear side of the covering cap 50, and is screwed with the threaded portion 44 of the fixing ring 40. With reference to FIGS. 2 and 3, the engaging block 53 is formed on and protrudes from the internal surface of the covering cap 50 adjacent to the front side of the covering cap 50, and engages with the annular groove 242 of the rotating ring 24 via the engaging mouth 243 of the rotating ring 24 when the covering cap 50 is mounted around the open end of the valve jacket 20.

Furthermore, the covering cap 50 may be connected to the fixing ring 40 by means of engaging or rotating-locking. In addition, the positions of the engaging block 53 of the covering cap 50 and the annular groove 242 of the valve jacket 20 can be exchanged with each other. Additionally, the front side of the covering cap 50 may be connected to the open end of the valve jacket 20 by other structures. In the present invention, the connecting structures between the covering cap 50, the fixing ring 40, and the valve jacket 20 are not limited specifically.

With reference to FIGS. 2, 3, and 4, in assembly, the seat 10 is deposited inside a wall 80 and the outer end of the tubular sleeve 12 extends out of the wall 80. The fixing ring 40 is screwed with the tubular sleeve 12 by the inner thread face 42 and the screwing face 122 to make the protruding flange 43 pressing against the wall 80. The valve 30 is mounted in the valve jacket 20, and the valve jacket 20 is mounted in the chamber 13 of the seat 10 via the outer end of the tubular sleeve 12. The tubular sleeve 12 is screwed with the at least one linking base 11 to enable the set of water pipes 22 of the valve jacket 20 to insert into the seat 10 to provide a water-guiding effect, and this makes the valve jacket 20 scalably sliding in the chamber 13 of the seat 10 without rotating relative to the seat 10. The engaging block 53 of the covering cap 50 engages with the annular groove 242 and the stopping flange 244 of the rotating ring 24, and the screwed segment 52 of the covering cap 50 is connected to the threaded portion 44 of the fixing ring 40. Then, when the covering cap 50 is rotated and moved, the rotating ring 24 is rotated with the covering cap 50 and the valve jacket 20 is moved with the covering cap 50, and the covering cap 50 is securely connected to and positioned at the fixing ring 40 to complete the assembling of the wall-mounted water-controlling valve assembly as shown in FIGS. 1 and 4.

Figure 5:
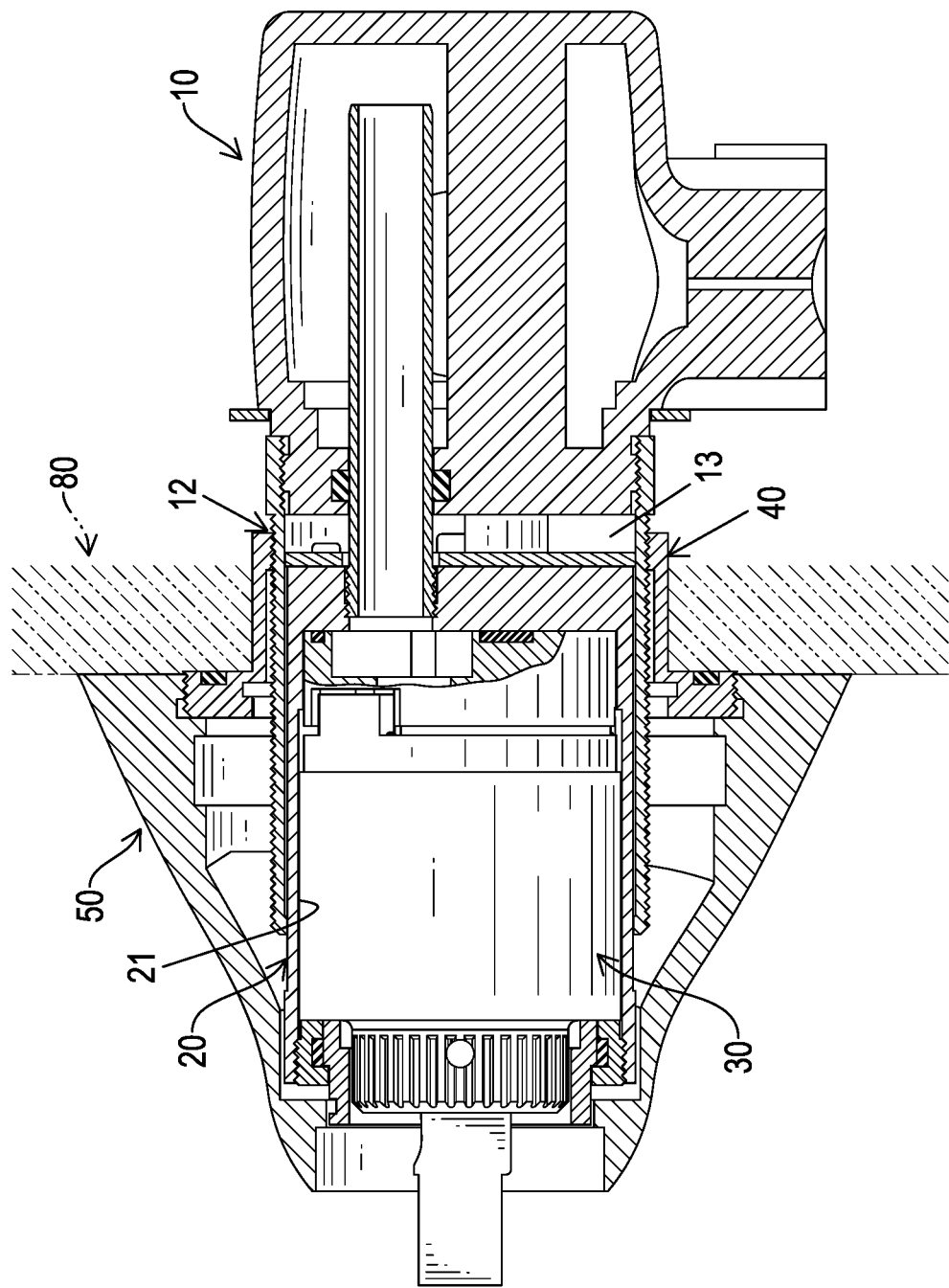
FIG. 5 is an operational side view in partial section of the wall-mounted water-controlling valve assembly in FIG. 4, adjusting a position of a valve jacket of the wall-mounted water-controlling valve assembly according to a position of a wall.
Figure 6:
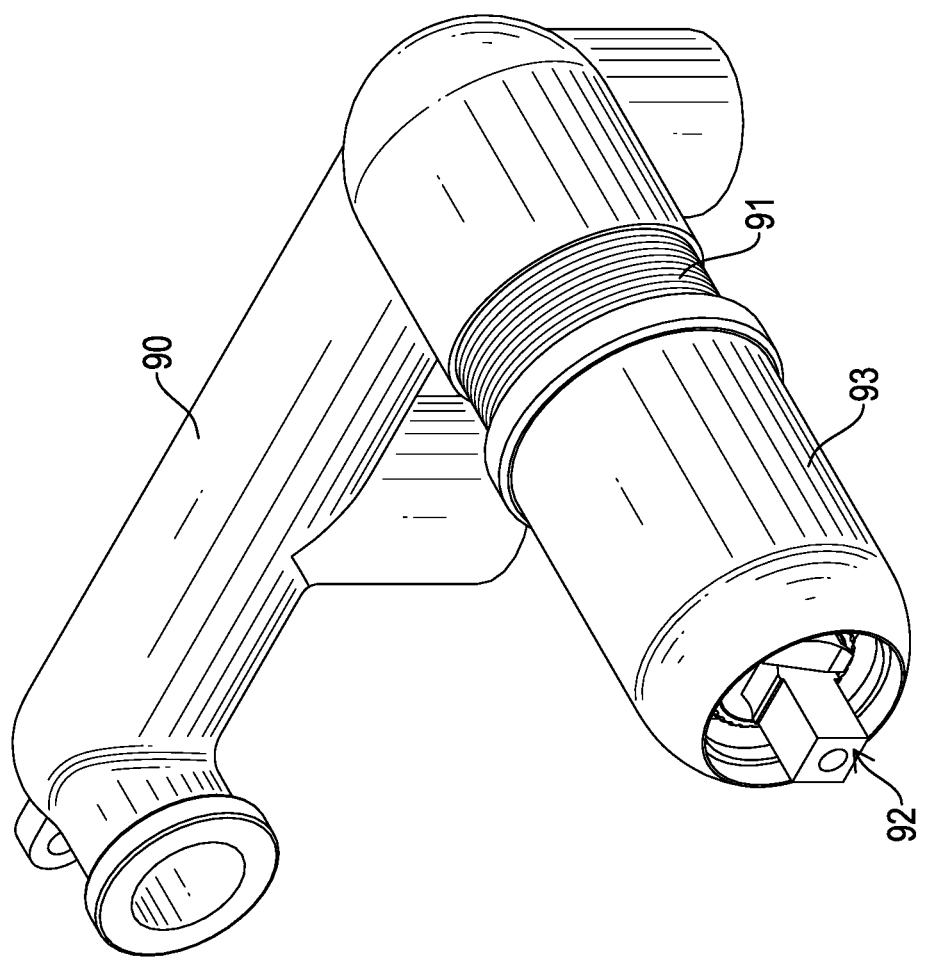
FIG. 6 is a perspective view of a wall-mounted water-controlling valve assembly in accordance with the prior art.

With reference to FIGS. 4 and 5, the valve 30 is scalably slid in the tubular sleeve 12 of the seat 10 via the valve jacket 20. With the linkage and the positioning of the covering cap 50, a protruding length of the wall-mounted water-controlling valve assembly relative to the wall is adjusted to remain at the same length. In addition, the covering cap 50 engages with the rotating ring 24 of the valve jacket 20, and with the rotatable design of the rotating ring 24, the valve jacket 20 and the valve 30 can be moved telescopically at a desired position when the covering cap 50 is securely connected to the fixing ring 40. The installation, dismantling, maintenance of the wall-mounted water-controlling valve assembly are quite simple and convenient, so difficulty of construction is effectively reduced and the construction quality is improved with high industrial value.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A wall-mounted water-controlling valve assembly comprising:
   a seat having
      a tubular sleeve being round and having
         an outer end; and
         an external surface; and
      a chamber formed in the tubular sleeve and having an opening formed through the outer end of the tubular sleeve;
   a valve jacket slidably mounted in the chamber of the seat and having
      an open end; and
      a valve room formed in the valve jacket;
   a valve mounted in the valve room of the valve jacket and having a valve stem extending out of the valve jacket;
   a fixing ring mounted on the external surface of the tubular sleeve by screwing; and
   a covering cap connected to the valve jacket and the fixing ring and having
      a front side connected to the open end of the valve jacket; and
      a rear side connected to the fixing ring;
   wherein the valve jacket further has
      a limiting ring deposited at the open end of the valve jacket and pressed against the valve; and
      a rotating ring rotatably deposited between the limiting ring and the valve and having a front end extending out of the limiting ring and connected to the covering cap.

2. The wall-mounted water-controlling valve assembly as claimed in claim 1, wherein
   the rotating ring has
      an external surface;
      an outer periphery;
      an annular groove formed on the external surface of the rotating ring adjacent to the front end of the rotating ring; and
      an engaging mouth formed through the outer periphery of the rotating ring and communicating with the annular groove; and
   the covering cap has an engaging block deposited on the front side of the covering cap to engage with the annular groove of the rotating ring via the engaging mouth.

3. The wall-mounted water-controlling valve assembly as claimed in claim 2, wherein the limiting ring is connected to the open end of the valve jacket by screwing.

4. The wall-mounted water-controlling valve assembly as claimed in claim 3, wherein
   the rotating ring has a step edge formed on the external surface of the rotating ring adjacent to the annular groove; and
   the limiting ring has
      an internal surface; and
      a positioning flange formed on and protruding inwardly from the internal surface of the limiting ring and pressed against the step edge of the rotating ring.

5. A wall-mounted water-controlling valve assembly comprising:
   a seat having
      a tubular sleeve being round and having
         an outer end; and
         an external surface; and
      a chamber formed in the tubular sleeve and having an opening formed through the outer end of the tubular sleeve, the seat further having a linking base and the tubular sleeve being connected to the linking base by screwing and has an internal surface; and
      a limiting flange formed on and protruding from the internal surface of the tubular sleeve at the outer end of the tubular sleeve; and
   a valve jacket slidably mounted in the chamber of the seat and having an open end; and
   a valve room formed in the valve jacket, the valve jacket further having
      an external surface;
      a closed end; and
      an engaging flange deposited on the closed end of the valve jacket, extending out of the external surface of the valve jacket, and selectively engaging with the limiting flange of the tubular sleeve; and
   a valve mounted in the valve room of the valve jacket and having a valve stem extending out of the valve jacket;
   a fixing ring mounted on the external surface of the tubular sleeve by screwing; and
   a covering cap connected to the valve jacket and the fixing ring and having
      a front side connected to the open end of the valve jacket; and
   a rear side connected to the fixing ring.

6. The wall-mounted water-controlling valve assembly as claimed in claim 1, wherein the rear side of the covering cap is connected to the fixing ring by screwing.

7. The wall-mounted water-controlling valve assembly as claimed in claim 2, wherein the rear side of the covering cap is connected to the fixing ring by screwing.

8. The wall-mounted water-controlling valve assembly as claimed in claim 3, wherein the rear side of the covering cap is connected to the fixing ring by screwing.

9. The wall-mounted water-controlling valve assembly as claimed in claim 4, wherein the rear side of the covering cap is connected to the fixing ring by screwing.

10. The wall-mounted water-controlling valve assembly as claimed in claim 5, wherein the rear side of the covering cap is connected to the fixing ring by screwing.

11. The wall-mounted water-controlling valve assembly as claimed in claim 6, wherein the fixing ring has
    a protruding flange formed on and protruding radially from a front side of the fixing ring and having an external surface; and
    a threaded portion formed on the external surface of the protruding flange.

12. The wall-mounted water-controlling valve assembly as claimed in claim 7, wherein the fixing ring has a protruding flange formed on and protruding radially from a front side of the fixing ring and having an external surface; and a threaded portion formed on the external surface of the protruding flange.

13. The wall-mounted water-controlling valve assembly as claimed in claim 8, wherein the fixing ring has a protruding flange formed on and protruding radially from a front side of the fixing ring and having an external surface; and a threaded portion formed on the external surface of the protruding flange.

14. The wall-mounted water-controlling valve assembly as claimed in claim 9, wherein the fixing ring has a protruding flange formed on and protruding radially from a front side of the fixing ring and having an external surface; and a threaded portion formed on the external surface of the protruding flange.

15. The wall-mounted water-controlling valve assembly as claimed in claim 10, wherein the fixing ring has a protruding flange formed on and protruding radially from a front side of the fixing ring and having an external surface; and a threaded portion formed on the external surface of the protruding flange.

* * * * *